Sept. 21, 1937.　　　C. H. WHITLOCK　　　2,093,500
CAMERA FINDER
Original Filed Dec. 8, 1933　　3 Sheets-Sheet 1
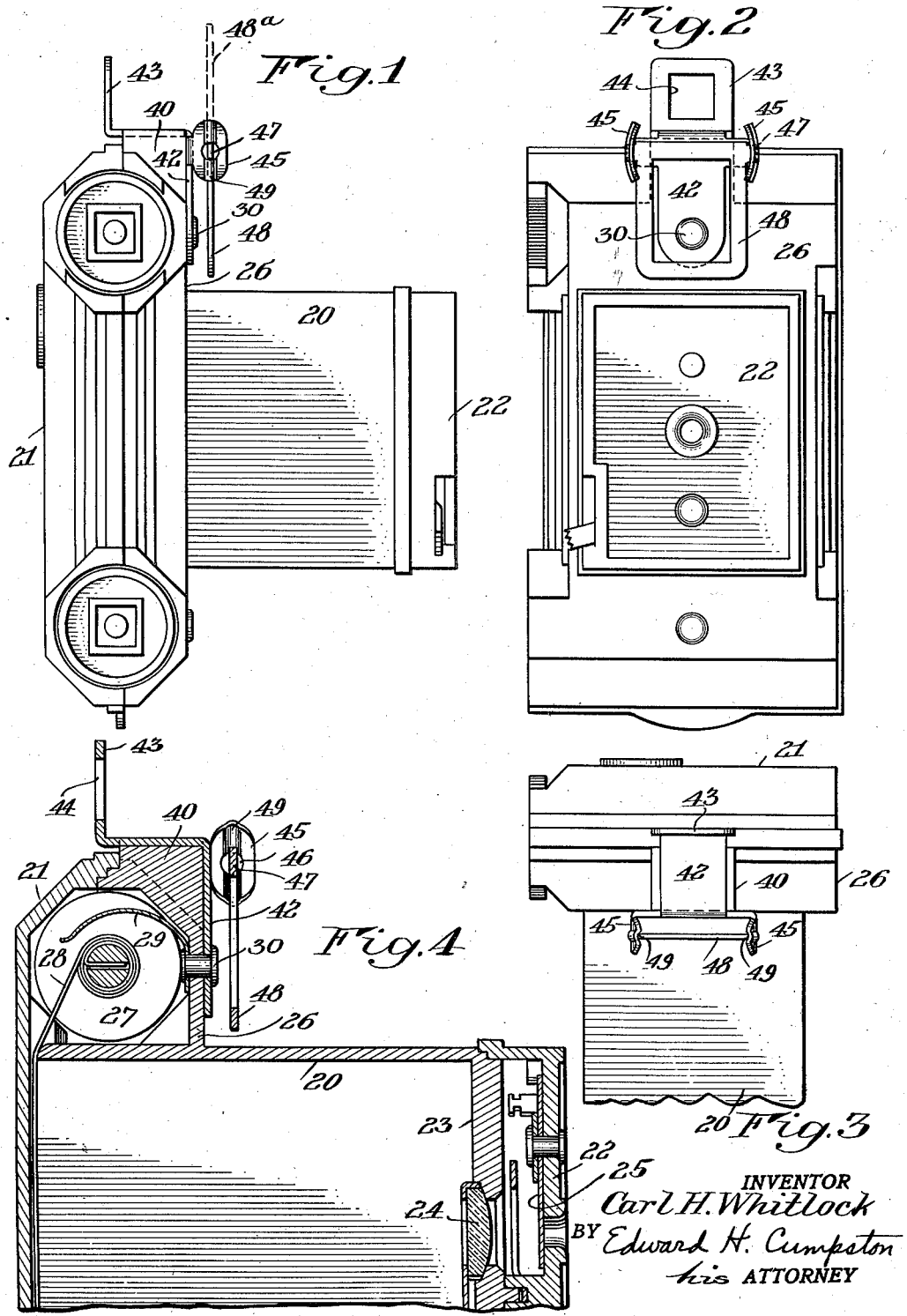

Sept. 21, 1937.  C. H. WHITLOCK  2,093,500
CAMERA FINDER
Original Filed Dec. 8, 1933   3 Sheets-Sheet 2

INVENTOR
Carl H. Whitlock
BY Edward H. Cumpston
his ATTORNEY

Sept. 21, 1937.   C. H. WHITLOCK   2,093,500
CAMERA FINDER
Original Filed Dec. 8, 1933   3 Sheets-Sheet 3

INVENTOR
Carl H. Whitlock
BY Edward H. Cumpston
his ATTORNEY

Patented Sept. 21, 1937

2,093,500

UNITED STATES PATENT OFFICE 2,093,500

CAMERA FINDER

Carl H. Whitlock, Lockport, N. Y., assignor, by mesne assignments, to Universal Camera Corporation, New York, N. Y., a corporation of New York Original applications December 8, 1933, Serial No. 701,488, and January 29, 1934, Serial No. 708,770. Divided and this application August 14, 1934, Serial No. 739,801

3 Claims. (Cl. 33—64)

This invention relates to photographic cameras and more particularly to the so-called finders of such cameras, which enable the operator to determine the field of view which will be embraced by a picture taken with the camera.

An object of the invention is the provision of a simple and effective camera finder of the direct view type, requiring no lens, mirror, or ground glass plate.

Another object is the provision of such a finder which is light and compact, inexpensive to construct, and easy to apply to the camera with which it is to be used.

To these and other ends the invention resides in certain improvements and combinations of parts, all as will be hereinafter more fully described, the novel features being pointed out in the claims at the end of the specification.

In the drawings:

Fig. 1 is a side elevation of a camera having a finder constructed according to one embodiment of the present invention;

Fig. 2 is a front view thereof;

Fig. 3 is a fragmentary plan thereof;

Fig. 4 is a longitudinal vertical section through a part of the camera and the finder;

The same reference numerals throughout the several views indicate the same parts.

Figure 5:
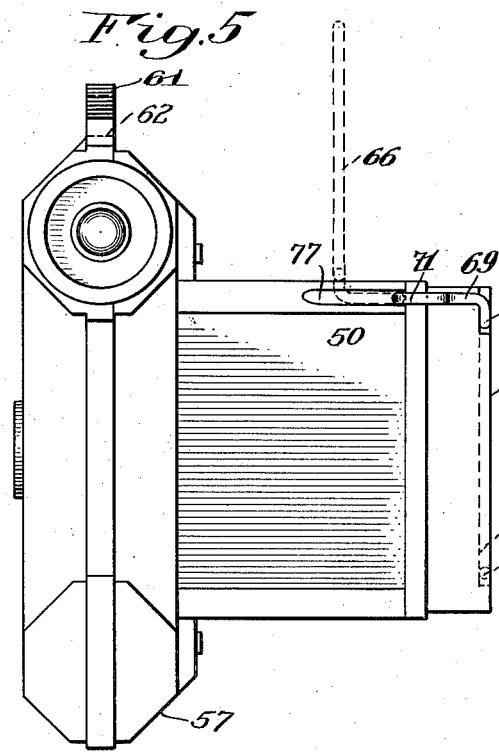
Fig. 5 is a side elevation of a slightly different camera having a finder constructed according to another embodiment of the present invention.

The present application, as to the subject matter of Figs. 1 to 4, inclusive, is a division of my application for patent on Camera, Serial No. 701,488, filed December 8, 1933, and as to the subject matter of Figs. 5 to 12, inclusive, is a division of my application for patent on Camera, Serial No. 708,770, filed January 29, 1934. Various subject matter disclosed but not claimed in this present application is claimed in said parent applications and in other divisions thereof.

Referring now to Figs. 1 to 4 inclusive, there is shown a camera comprising in general a body 20 including a removable back cover 21, a front cover 22 (which may be permanently attached to the rest of the body), a wall 23, a lens 24, and suitable shutter mechanism including a shutter blade 25 located between the parts 22 and 23.

At an intermediate point between the front and back of the camera there is a wall 26 extending upwardly and then rearwardly to form, together with a part of the back cover 21, a spool chamber for receiving a spool 27 on which the film 28 may be wound. A spring member 29 in the spool chamber partly encircles the spool and contacts with the film, when any considerable amount of film is on the spool, to hold the film snugly in place and prevent accidental unwinding of the convolutions thereof. This spring member 29 may be held in place by a rivet 30 passing through the wall 26.

Preferably the parts 20, 21, 22, 23, and 26, are all molded from some suitable molding material, such for example as "Bakelite".

On the upper front outer surface of the walls 26 forming the upper spool chamber, approximately along the optical center of the camera, there is preferably a lug 40 molded integrally with the wall 26, which lug 40 presents a square corner around which an angular metallic bracket 42 may extend, as best shown in Figs. 1 and 4. The same rivet 30 which holds the spring 29 in place in the spool chamber may also pass through the bracket 42 to hold it in place, as clearly seen in Fig. 4. The bracket 42 passes upwardly along the front of the molded lug 40, turns approximately a right angle and passes rearwardly through a shallow groove formed in the top of the lug 40, and thence is bent again and once more extends upwardly as at 43, this last upwardly extending portion having a viewing aperture 44 formed therein so that the member 43 forms a viewing element through which one may look. The sides of the above mentioned shallow groove in the top surface of the molded lug 40 engage the sides of the bracket 42 so that this part of the bracket is held firmly against sidewise movement and thus the single rivet 30 is sufficient to attach the bracket securely to the camera body, no other securing means being needed.

Near the upper front corner of the bracket 42 are two ears 45, preferably struck up from the same piece of sheet metal of which the bracket itself is formed. These ears 45 each have an aperture 46 for receiving pivot extensions 47 formed at the sides of a rectangular metallic member 48 which is apertured to form a second viewing element. The ears 45 are slightly curved in a vertical direction, as shown in Fig. 2, and are provided along their inner faces with slight vertical grooves 49 which receive the side edges of the viewing element 48 in either of two positions approximately 180° apart.

When it is not in use, the second viewing element 48 is turned downwardly to the position shown in full lines in Figs. 1, 2, and 4, the side edges of the element then snapping into the lower parts of the grooves 49. In this position, the element 48 lies substantially along the outer side of the front wall of the upper spool chamber, as shown, with the bottom or free end of the element close to, but slightly above, the flat top wall of the camera body, as plainly seen in the drawings, and it is also seen that in this position the viewing element is substantially parallel to the camera front 22.

When it is desired to use the viewing elements as a finder to observe the photographic field of the camera, then the element 48 is grasped and forcibly pulled forwardly and upwardly to snap it out of the lower parts of the grooves 49 and turn it approximately 180° until it snaps into the upper parts of the grooves 49, the ears 45 being slightly resilient so that this may be readily accomplished. When turned up to this effective viewing position, the element 48 occupies the dotted line position indicated at 48a in Fig. 1 of the drawings, and the large aperture therethrough is in optical alinement with the smaller aperture 44 through the non-collapsible viewing element 43. The sizes of the apertures in the two viewing elements are, of course, so proportioned with respect to each other and to the distance between them, that when the eye of a person is held just to the rear of the element 43, the person by looking through the apertures in the alined elements 43 and 48 will see, framed by these viewing elements, the photographic field of the camera. Thus these viewing elements constitute a direct view finder of simple and effective form, which can be made inexpensively and which is easily applied to the camera during the course of its manufacture.

Referring now to Figs. 5 to 12 inclusive, there is here shown a somewhat similar but slightly different form of camera, including a direct view finder of an alternative construction.

The camera comprises a body 50 having a removable rear cover 51, a front cover 52, and a partition 53 spaced somewhat rearwardly from the front cover, as shown. It also has a lens 54, and suitable shutter mechanism including, for example, a shutter blade 55 located in the space between the walls 52 and 53. The front cover 52 is held on the rest of the camera in any suitable manner, preferably being permanently secured thereto as by means of a rivet 56.

At the top and bottom of the camera body are walls 57 forming, together with the back cover 51, spool chambers for holding film spools 58 on one of which the film may be supplied and on the other of which it may be wound up after exposure in any suitable manner. The back cover 51 is removable to obtain access to the film spools, and when it is replaced on the rest of the camera body it is held thereon in any suitable manner, preferably by tight frictional engagement therewith.

Figure 9:
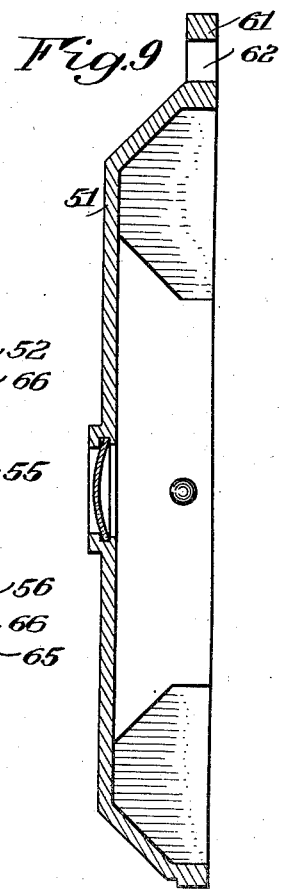
Fig. 9 is a similar view of the back cover of the camera removed from the rest of the body.
Figure 10:
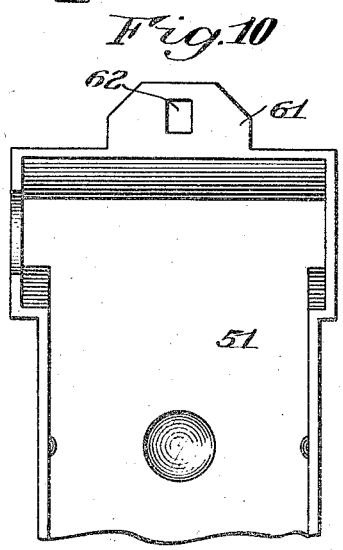
Fig. 10 is a fragmentary elevation of said back cover, viewed from the inside.

The field viewing means in the present embodiment includes a lug 61 projecting upwardly from the top of the upper spool chamber, which lug has a sighting aperture 62 therethrough. So far as mere viewing of the field is concerned, this lug may be formed either on the main camera body or on the removable back cover, but it is preferable to form it, as shown in Figs. 8, 9, and 10, as a molded part integral with the back cover 51, so that this lug may serve also as a convenient part against which to press rearwardly when it is desired to remove the back cover from the camera.

Figure 12:
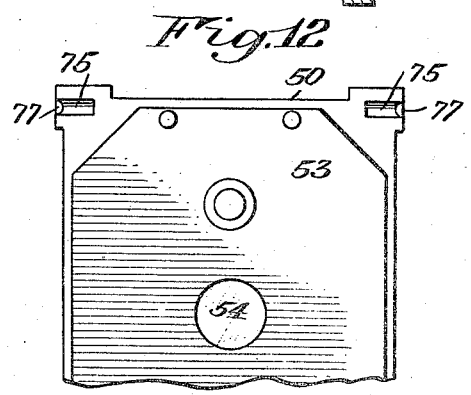
Fig. 12 is an elevation of the front end of the camera with the front cover and other parts removed.

The aperture 62 forms the rear sight of a pair of sights, the front one of which is formed by a pivoted bent wire frame best shown in Figs. 1, 2, and 3. The frame is formed of a piece of wire bent into generally U shaped form with an end cross bar 65 and spaced parallel sides 66, as shown in Fig. 2. From the ends of these sides 66, the wire extends outwardly as at 67, thence is offset slightly upwardly at 68, then rearwardly and slightly inwardly at 69 to an angular nub or point 70, then further rearwardly and outwardly at 71, and finally inwardly at 72, the inwardly extending ends being received in suitable recesses in the camera and forming pivots about which the entire wire frame may be turned. The wire frame may conveniently be pivoted to the camera substantially at the junction between the main camera body 50 and the front cover member 52. For instance, the upper front corners of the body 50 may have recesses 75 on their front surfaces, as shown in Fig. 12, and the inwardly extending ends 72 of the wire frame may be engaged in these recesses 75, being held therein by the rear surfaces of the front cover member 52 which abut against that portion of the body 50 in which the recesses 75 are located and serve to close the open forward sides of these recesses.

Figure 6:
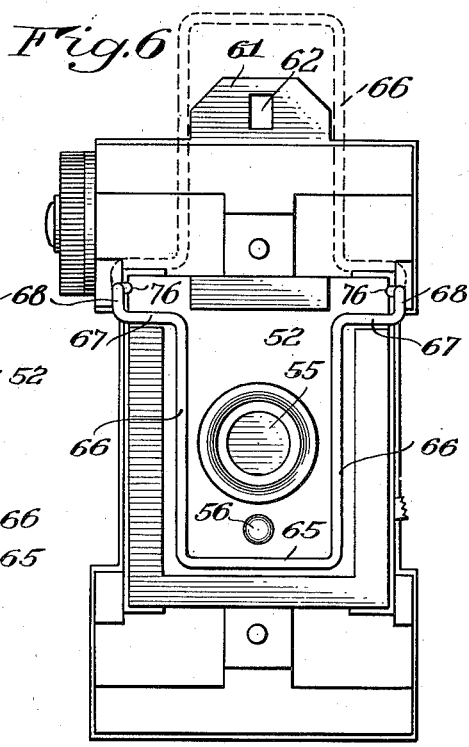
Fig. 6 is a front view thereof.
Figure 11:
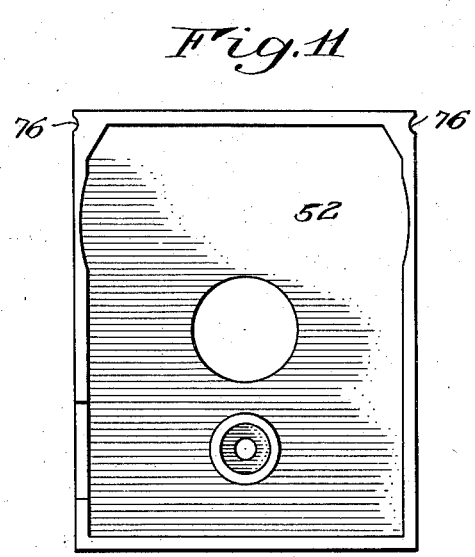
Fig. 11 is an elevation of the front cover of the camera, viewed from the inside.
Figure 7:
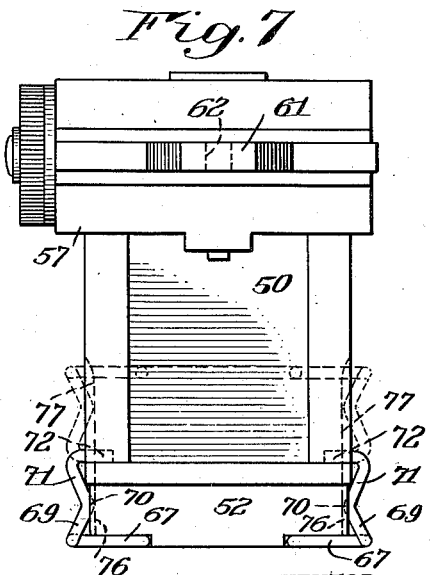
Fig. 7 is a plan thereof.
Figure 8:
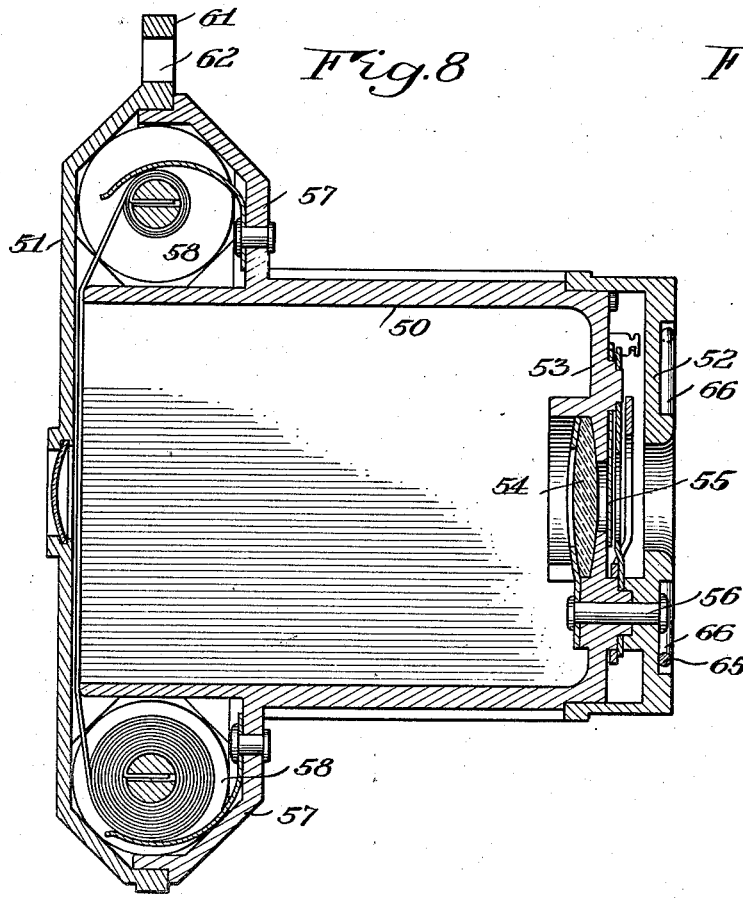
Fig. 8 is a longitudinal vertical section through the camera shown in Figs. 5-7.

The wire frame when not in use may be swung down so that the main U shaped part thereof lies substantially along the front surface of the camera front 52, as plainly shown in full lines in Figs. 6 and 8. The front member 52 is provided near its top, with a groove 76 at each side, as shown in Figs. 7 and 11, and the points or corners 70 of the wire frame spring into these grooves 76 when the frame is turned down to the ineffective position just described, to retain the frame resiliently in place.

When it is desired to use the finder, the wire frame is grasped and forcibly pulled forwardly and upwardly, to spring the points 70 out of the grooves 76, and the frame is turned approximately 180° about its pivots 72 to bring it to the dotted line position illustrated in Figs. 5, 6, and 7. In this position, the laterally extending portions 67 of the wire frame lie on top of the main camera body 50 and prevent further rearward movement of the frame, while the pointed shoulders 70 now engage in groove 77 formed on the sides of the camera body near their top edges to hold the frame in this upright effective position. The wire of which the frame is made is, of course, sufficiently resilient so that the corners 70 will spring into the respective grooves 76 and 77, but may be forcibly sprung out of these grooves by slight effort.

It will be seen that the two positions of the wire frame viewing element are substantially offset from each other. In the effective position the main part of the viewing element lies substantially along the front face of and parallel to the camera front 52, while in the ineffective viewing position the main part of the viewing frame lies in a plane still parallel to the camera front 52 but spaced rearwardly a considerable distance therefrom, as readily seen from Fig. 5. When the wire frame is erected to its upstanding viewing position it is in optical alinement with the viewing aperture 62 in the rear viewing element 61, so that if the operator places his eye just to the rear of the aperture 62, he may sight through this aperture and through the outline of the U shaped part of the wire frame, which is of the proper size and proportion so that it will then define for the operator the approximate photographic field of the camera.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A non-collapsible camera comprising a substantially rigid body having a generally rectangular portion and extensions on two opposite sides of said portion at the rear end thereof to form chambers for receiving film spools, a viewing element extending outwardly from one of said extensions in substantially fixed position relatively thereto, and a second viewing element pivotally mounted adjacent said one of said extensions and adapted, when not in use, to be folded down along the front of said one of said extensions with its free edge closely adjacent one side of said rectangular body portion.

2. A non-collapsible camera comprising a substantially rigid body having a generally rectangular portion and extensions on two opposite sides of said portion at the rear end thereof to form chambers for receiving film spools, a member fixedly mounted on one of said extensions, said member comprising a fixed viewing element extending outwardly from one of said extensions, and a second viewing element pivotally mounted on said member and adapted to be folded down along the front of said one of said extensions with its free end adjacent the top wall of said rectangular body portion.

3. A non-collapsible camera comprising a substantially rigid body having a generally rectangular portion and extensions on two opposite sides of said portion at the rear end thereof to form chambers for receiving film spools, a viewing element comprising a member having a vertical portion projecting above the top wall of said spool chamber and provided with a viewing aperture, a second vertical portion substantially parallel to said apertured vertical portion and extending below the said top wall, a horizontal portion interconnecting said vertical portions, said horizontal portion being disposed adjacent the said top wall, said second vertical portion being fixed to said camera wall and provided with a pair of aligned ears, and a second member mounted in said ears, said second member being provided with an aperture adapted to be in optical alignment with said first mentioned viewing aperture.

CARL H. WHITLOCK.